United States Patent Office 3,371,112
Patented Feb. 27, 1968

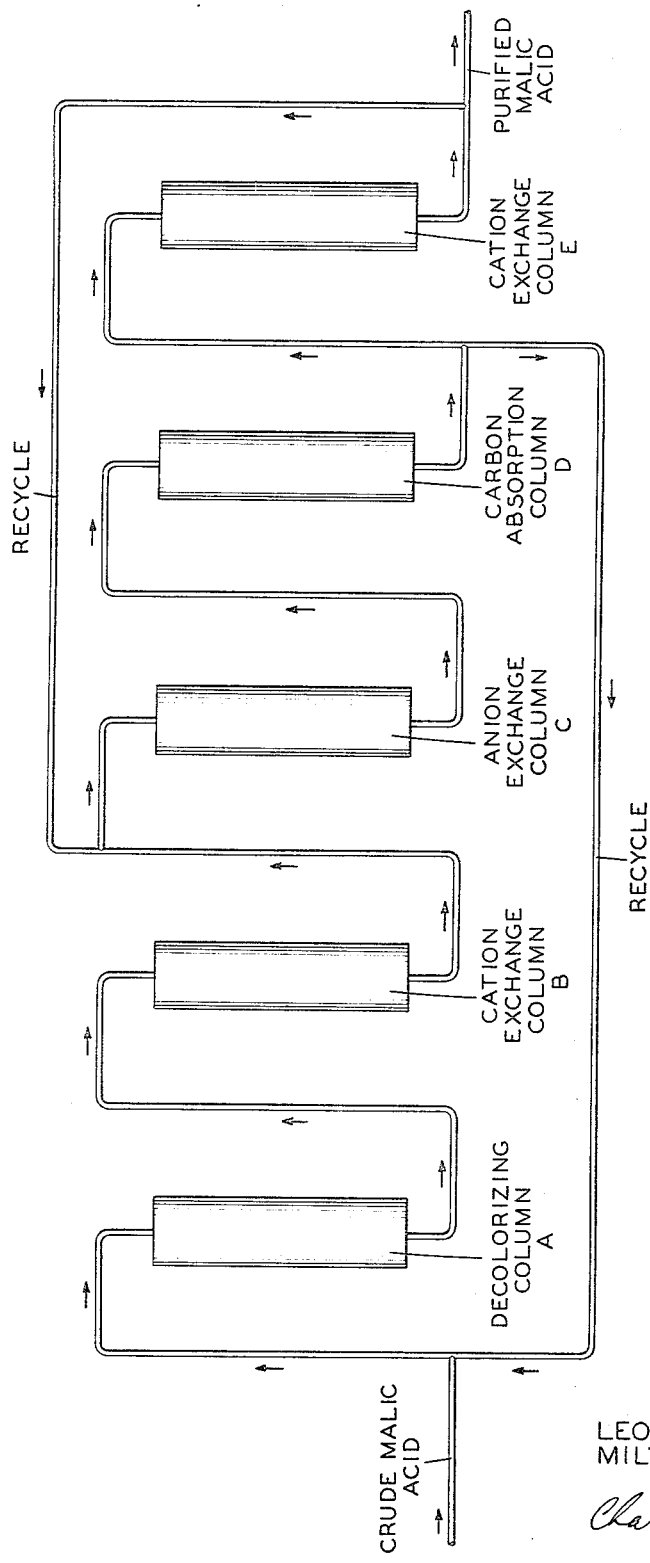

3,371,112
PURIFICATION OF CRUDE MALIC
ACID LIQUORS
Leon O. Winstrom, East Aurora, and Milton R. Ingleman,
Hamburg, N.Y., assignors to Allied Chemical Corporation, New York, N.Y., a corporation of New York
Filed Dec. 18, 1964, Ser. No. 419,540
6 Claims. (Cl. 260—535)

ABSTRACT OF THE DISCLOSURE

Malic acid liquors containing unsaturated organic acid impurities, particularly maleic and fumaric acid, are purified by contacting the liquors with a weakly basic anion exchange resin. Preferably the liquor is also contacted with a carbon adsorbent and with a cationic exchange resin.

---

The chemical synthesis of malic acid from aqueous maleic acid is well known. This synthesis is believed to proceed in two steps, the first being the isomerization of maleic to fumaric acid, the second being the hydration of fumaric to the desired malic acid. These reactions are usually carried out at elevated temperatures, i.e., above about 150° C., and under superatmospheric pressure, i.e., about 10 atmospheres or more. The product of this reaction is an equilibrium mixture of malic, fumaric and maleic acids, which is usually contaminated with relatively small amounts of colored compounds of unknown composition together with various cations arising principally from the process water used and from the corrosion of the reactor by the hot maleic acid liquor. The greater portion of the fumaric acid is recovered as crystals by cooling the reaction mixture to about 25° C. and there is isolated from this process a crude malic acid liquor containing about 5% of fumaric and maleic acids together with the above-mentioned colored impurities and various cations, which include calcium, magnesium, iron and the like. Depending upon the material of construction used for the process equipment various heavy metal cations such as lead, copper, chromium, nickel, may be present, also. Such cations should be removed prior to use of the malic acid in compositions intended for human consumption.

Methods practiced heretofore for purification of crude malic acid products are generally tedious, expensive and result usually in substantial losses of the desired malic acid. According to one method, crude malic acid, in a liquor containing minor amounts of fumaric and maleic acids, colored impurities and undesirable cations, is converted to the insoluble calcium malate. This salt is filtered from the mother liquor containing most of the fumaric and maleic acids as well as a considerable quantity (15 to 20%) of malic acid. The precipitated calcium salt is digested in aqueous sulfuric acid to recover malic acid while precipitating calcium as the sulfate. The mother liquor is freed of sulfate ions with barium carbonate and oxalic acid. Treatment with decolorizing charcoal removes colored compounds and soluble iron is removed with calcium ferrocyanide. As can be seen, such purification procedures are time consuming, costly and only relatively effective.

It is therefore a principal object of the present invention to provide a novel process for the purification of malic acid liquors.

Another object is to provide a simple and effective process for the purification of malic acid liquor contaminated with fumaric and/or maleic acids.

Still another object is to provide a process for the preparation of malic acid suitable for human consumption.

Other objects will be apparent from the following description of our invention.

In accordance with the present invention, malic acid liquor obtained from the reaction of aqueous maleic acid at elevated temperature and superatmospheric pressure is purified by contacting the liquor with an anion exchange resin to remove fumaric and maleic acids present in minor amounts, and by contacting the liquor with a cation-exchange resin to remove undesirable metal cations. Preferably the liquor is contacted also with adsorbent carbon material in order to eliminate colored impurities of unknown constitution.

In those instances wherein crude malic acid liquor is treated to remove only unsaturated acid contaminants but also undesirable metal ions and/or colored impurities, the order of removal is not critical. Preferably, however, the crude malic acid liquor is first treated with carbon adsorption material to remove colored impurities, then with a cation exchange resin to remove undesirable metal ions and thereafter with an anion exchange resin to remove maleic and fumaric acids. If desired, the carbon adsorption treatment and the cation exchange treatment may be repeated in any order, as a "polishing" or finishing treatment.

Anion exchange resins are well known in the art and the phenomena of their action has been the subject of many intensive studies. These materials function either in batch or column procedures although the latter are generally preferred as a matter of convenience. Anion exchange resins are basic materials and function to remove acidic materials on contact. They may be strongly basic, of a strength comparable to caustic alkali or weakly basic, of a strength comparable to organic amines, e.g., propylamine. In the removal of maleic and fumaric acids from solutions of malic acid, we prefer to use anionic resins of weakly basic character such as those described in U.S. Patents 2,356,151 to Eastes, Aug. 22, 1944; 2,591,574 to McBurney, Apr. 1, 1952; 2,614,099 to Bauman et al., Oct. 14, 1952; and 2,675,359 to Schneider, Apr. 13, 1954. Another resin we prefer to use is a polystyrene resin containing aminomethyl substituents and available under the trade designation of Amberlite IR–45.

Cation-exchange resins, likewise, are well known. These resins contain active acidic groups, usually sulfonic acid groups, whose function is to remove cations from contacting solutions and replace those cations with hydrogen ions. These resins function, also, in batch or column procedures, the latter being preferred, and the resins may contain strongly acid to weakly acid groups. Cation exchange resins of this type are described in the patent literature such as for example, U.S. Patents 2,340,111 to D'Alelio, Jan. 25, 1944, and 2,366,007 to D'Alelio, Dec. 26, 1944. In the present instance, we prefer to use a sulfonated polystyrene which has been crosslinked with divinyl benzene. Such a resin is available under the trade designation "Amberlite IR–120" or "Dowex 50W."

The carbon adsorbent material can be selected from a broad class of well known activated carbons. Their effectiveness as decolorizing agents for liquid solutions is well known also. These materials, which depend, in part, upon the large ratio of surface area to their mass are available in forms which vary in the degree of porosity of the individual particles. We have found that activated carbons having smaller pore sizes in the range of 18 to 21 Angstrom units diameter are preferable because they are effective as decolorizers and also aid in the removal of unsaturated acids; however we have also found that those carbons having larger average pore sizes in the range of 20 to 100 Angstrom units diameter are suitable. A commercial activated carbon having a smaller pore structure is Type BPL granular carbon, while Type CAL and Type SGL granular carbons are activated carbons having a larger pore size. It is believed that the smaller pores of the carbon function as molecular sieves to block relatively larger unsaturated acid molecules while permitting the passage therethrough of the smaller less rigid malic acid molecules.

We have found that the anionic resin column more rapidly becomes "spent" with respect to its ability to remove fumaric acid than maleic acid and thereafter the more strongly acid maleic acid displaces the weaker fumaric acid thereby permitting the latter to emanate from the anion exchange column. In order to increase the time interval between regenerations, we have found that the presence of a fine pore, activated carbon adsorbent after the anion column is effective in preventing the fumaric acid when it has passed out of the anion exchange column from remaining in the purified malic acid liquor. And we have found it preferable to operate our improved process in this manner.

The accompanying drawing illustrates a preferred mode of operation of our process. Crude malic acid liquor is passed first through column A containing Type CAL granular carbon in order to remove color contaminants. From there the decolorized malic acid liquor is passed through column B containing a cation exchange resin which acts to remove metal cation contaminants. Thereafter the liquor is run through column C, containing an anion exchange resin, whereby fumaric acid and maleic acid are removed from the malic acid liquor. Thence the liquor is contacted with Type BPL granular carbon in column D whose effect is to prevent fumaric acid from remaining in the malic acid liquor. A cation exchange column, column E, next receives the malic acid liquor for its final treatment before the purified malic acid is recovered. As noted the process may be run continuously and if desired the carbon adsorption treatment and cation exchange treatment may be repeated. It is to be understood that the drawing illustrates only a preferred mode of operation and that the columns may be rearranged in different sequences as desired.

The anionic resin exchange material can be regenerated, when exhausted or "spent," by treatment with aqueous alkaline solutions in the usual manner. Aqueous caustic alkali can be used at a temperature of 70° C., however the relatively low solubility of sodium acid malate incurs a risk of plugging the column. Accordingly, it is preferred to use a 4% aqueous ammonium hydroxide solution at ambient temperature to regenerate the anionic exchange resin. This solution can also be used to regenerate the carbon adsorbent column(s) when used.

The cationic exchange resin material can be regenerated with dilute, e.g., 5%, mineral acids, e.g., sulfuric and hydrochloric acids, in the usual manner.

The carbon adsorption columns when spent can be regenerated, as indicated above, by passage therethrough of dilute aqueous alkaline solutions preferably 4% aqueous ammonium hydroxide, at ambient temperature.

The invention will be illustrated by the following examples, but it is to be understood that it is not to be limited to the specific details thereof, and that changes can be made without departing from the scope or spirit of the invention.

*Example 1.*—An absorber train consisting of four glass columns, each 2 in. x 4 ft., were charged as follows:

Column 1.—800 g. Type CAL granular carbon (12 x 40 mesh size);
Column 2.—1100 g. anion exchange resin (IR–45);
Column 3.—800 g. Type BPL granular carbon (8 x 30 mesh);
Column 4.—1200 g. cation exchange resin (IR–120).

The columns were connected in series and the train was backwashed with tap water to size and to remove occluded air.

Crude malic acid liquor containing about 27.5% by weight of malic acid and 1.0% unsaturated organic acids, essentially all maleic and fumaric acids, was passed into the column train, flowing from top to bottom of each column, at the rate of 50 cc./minute. A total of 12 liters of malic acid liquor was so treated. The effluent was collected in 2 liter portions and analyzed for unsaturated acids. A sample was taken at the bottom of column 2 as each portion was completed, and this sample also was analyzed for unsaturated acids. The results of these analyses are given in Table I below.

TABLE I

| Fraction | Percent Unsaturated Acids, Column 2 | 100% Basis of acid by weight, Column 4 |
| --- | --- | --- |
| 1 | 0.10 | 0.00 |
| 2 | 0.45 | 0.00 |
| 3 | 0.75 | 0.00 |
| 4 | 1.50 | 0.00 |
| 5 | 1.74 | 0.00 |
| 6 | 2.14 | 0.06 |

These data indicate, that the unsaturated acids were effectively removed from the crude malic acid liquor by this absorber train. On a 100% basis, the concentration of unsaturated acids (about 3.5% in the crude liquor) was effectively reduced, 85% of these acids being removed by the anion exchange column and 15% by the fine pore activated carbon column, before the train requires regeneration. The effluent liquor from this train, is decolorized and is free from cations of the group $Fe^{+++}$, $Cu^{++}$, $Ca^{++}$, $Mg^{++}$ and $Al^{+++}$.

*Example 2.*—Clarified malic acid liquor obtained by hydration of aqueous maleic and fumaric acid mixtures at elevated temperature and superatmospheric pressure and having the following composition: Maleic acid, 20 lbs.; fumaric acid, 25 lbs.; malic acid, 955 lbs.; in 2,333 lbs. water, in addition to an unknown amount of colored organic impurities and of one or more heavy metal ions of the group ferric, calcium, magnesium and the like ions, was fed, at the rate of two gallons per minute to a five column absorber train connected in series, the flow being from top to bottom of each column. The train was made up as follows:

Column 1.—Type CAL granular carbon, 87.7 lbs.
Column 2.—Cation exchange resin (IR–120), 65.7 lbs.
Column 3.—Anion exchange resin (IR–45), 221 lbs.
Column 4.—Type BPL granular carbon, 221 lbs.
Column 5.—Cation exchange resin, 55 lbs.

The effluent liquor from column 5 was monitored continuously by means of an ultra violet absorption analyzer to detect unsaturated acids. The crude malic acid liquor was directed to a second five column absorption train when the analyzer indicates leakage through of unsaturated acids.

The "spent" columns were regenerated as follows. The carbon absorbers (columns 1 and 4) and the anion exchange column were regenerated by pumping about 300 liters of 4% aqueous ammonium hydroxide through the columns in a reverse direction to the normal flow. The cation exchange columns were similarly regenerated with 150 liters of 5% aqueous sulfuric acid. The flow rate of the regenerating solutions was about 2 to 3 liters per minute. The columns were finally washed neutral, in the case of the carbon and anion exchange columns, and sulfate free in the case of the cation exchange resin columns, at the rate of about 4 liters per minute.

The purified malic acid liquor was obtained as a water-white, heavy metal ion free solution of malic acid containing 927 lbs. of malic acid per 2,333 lbs. water but no maleic or fumaric acids.

It can thus be seen that a practical and effective means has been devised for the purification of crude malic acid liquors contaminated with maleic and fumaric acids, and which may also contain colored organic impurities of unknown composition and various undesirable heavy metal cations.

The novel process of our invention, which is subject to numerous variations in the details of the above purely illustrative examples can be practiced in a discontinuous as well as continuous manner.

We claim:

1. A process for purifying crude aqueous malic acid liquor containing impurities comprising maleic acid, fumaric acid or mixtures thereof, which comprises contacting said liquor with a weakly basic anion exchange resin.

2. The process of claim 1 wherein the malic acid liquor is also contacted with a porous carbon adsorbent.

3. The process of claim 1 wherein the malic acid liquor is also contacted with a cationic exchange resin.

4. The process of claim 2 wherein the carbon adsorbent has a pore diameter in the range of 18 to 21 Angstrom units.

5. A process for purifying crude aqueous malic acid liquors containing maleic acid and fumaric acid which comprises contacting said liquor with the following materials and in the following order:

(a) adsorbent carbon,
(b) cationic exchange resin,
(c) an anion exchange resin, and
(d) adsorbent carbon having a pore diameter in the range of 18 to 21 Angstrom units.

6. The process of claim 5 wherein the anion exchange resin is a polystyrene resin containing amino-methyl substituents.

References Cited

UNITED STATES PATENTS

| | | | |
|---|---|---|---|
| 2,415,558 | 2/1947 | Hesler et al. | 260—535 |
| 3,109,025 | 10/1963 | Olenberg | 260—537 |

FOREIGN PATENTS 476,109  10/1937  Great Britain.

OTHER REFERENCES

Kunin: Industrial and Eng. Chem., vol. 56, No. 1, January 1964, pp. 35–39.

LORRAINE A. WEINBERGER, *Primary Examiner.*

A. P. HALLUIN, *Assistant Examiner.*